US010232347B2

(12) United States Patent
Lu et al.

(10) Patent No.: US 10,232,347 B2
(45) Date of Patent: Mar. 19, 2019

(54) HOLLOW MESOPOROUS CARBON NANOSPHERE COMPOSITE MATERIAL LOADED WITH GOLD NANOPARTICLES, AND PREPARATION METHOD THEREOF AND APPLICATION IN CONTINUOUS PROCESSING OF CO

(71) Applicant: SOOCHOW UNIVERSITY, Suzhou (CN)

(72) Inventors: Jianmei Lu, Suzhou (CN); Dongyun Chen, Suzhou (CN); Jun Jiang, Suzhou (CN)

(73) Assignee: SOOCHOW UNIVERSITY, Suzhou (CN)

(*) Notice: Subject to any disclaimer, the term of this patent is extended or adjusted under 35 U.S.C. 154(b) by 0 days.

(21) Appl. No.: 15/853,904

(22) Filed: Dec. 25, 2017

(65) Prior Publication Data
US 2018/0178197 A1    Jun. 28, 2018

(30) Foreign Application Priority Data
Dec. 28, 2016    (CN) .......................... 2016 1 1238530

(51) Int. Cl.
*B01J 21/18* (2006.01)
*B01J 23/52* (2006.01)
(Continued)

(52) U.S. Cl.
CPC ............. *B01J 21/185* (2013.01); *B01J 23/52* (2013.01); *C01B 32/15* (2017.08); *C01B 32/40* (2017.08);
(Continued)

(58) Field of Classification Search
CPC ...... B01J 21/185; B01J 23/52; B01J 2523/19; C01B 32/15; C01B 32/40; C08F 4/02;
(Continued)

(56) References Cited

U.S. PATENT DOCUMENTS

| 2007/0042268 A1* | 2/2007 | Pak | ......................... B01J 21/18 |
| | | | 429/213 |
| 2015/0232340 A1* | 8/2015 | Bao | ......................... C01B 31/04 |
| | | | 264/29.1 |

FOREIGN PATENT DOCUMENTS

| CN | 10-4591127 | * | 5/2015 | ............ B82Y 30/00 |
| CN | 10-5252015 | * | 1/2016 | ............... B22F 1/02 |

(Continued)

OTHER PUBLICATIONS

Xi Chen, et al., "Formation and catalytic activity of spherical composites with surfaces coated with gold nanoparticles." Journal of Colloid and Interface Sciences 322, pp. 414-420. (Year: 2008).*
(Continued)

*Primary Examiner* — Patricia L. Hailey
(74) *Attorney, Agent, or Firm* — SZDC Law P.C.

(57) ABSTRACT

A preparation method of hollow mesoporous carbon nanosphere composite material loaded with gold nanoparticles includes the following steps: (1) in the presence of an initiator, aniline and pyrrole are polymerized in deionized water containing a surfactant to form hollow carbon precursors, and then calcined to obtain hollow mesoporous carbon nanospheres, (2) said hollow mesoporous carbon nanospheres are immersed in a chloroauric acid solution, stirred and then centrifuged to remove the liquid, finally, hollow mesoporous carbon nanosphere composite material loaded with gold nanoparticles are obtained by reduction treatment.

9 Claims, 6 Drawing Sheets

(51) Int. Cl.
*C01B 32/15* (2017.01)
*C08F 4/02* (2006.01)
*C08F 26/06* (2006.01)
*C01B 32/40* (2017.01)
*C08F 292/00* (2006.01)

(52) U.S. Cl.
CPC ............. *C08F 4/02* (2013.01); *C08F 26/06* (2013.01); *C08F 292/00* (2013.01); *C01P 2004/03* (2013.01); *C01P 2004/04* (2013.01)

(58) Field of Classification Search
CPC .... C08F 26/06; C08F 292/00; Y02A 50/2341; C01P 2004/03; C01P 2004/04
USPC ........................... 502/184; 977/810; 428/403

See application file for complete search history.

(56) References Cited

FOREIGN PATENT DOCUMENTS

| CN | 10-6587009 | * 4/2017 | ............. C01B 32/15 |
| WO | 2013/151282 | * 10/2013 | ............... B82B 3/00 |

OTHER PUBLICATIONS

Isaac Nongwe et al., "Synthesis of gold encapsulated in spherical carbon capsules with a mesoporous shell structure. A robust catalyst in a nanoreactor." Catalysis Communications 53, pp. 77-82. (Year: 2014).*
Andres Seral-Ascaso et al., "Synthesis and application of gold-carbon hybrids as catalysts for the hydroamination of alkynes." Applied Catalysis A: General 456, pp. 88-95. (Year: 2013).*
Jianglai Cheng et al., "Preparation and characterization of monodisperse, micrometer-sized, hierarchically porous carbon spheres as catalyst support." Chemical Engineering Journal 242, pp. 285-293. (Year: 2014).*

* cited by examiner

HOLLOW MESOPOROUS CARBON NANOSPHERE COMPOSITE MATERIAL LOADED WITH GOLD NANOPARTICLES, AND PREPARATION METHOD THEREOF AND APPLICATION IN CONTINUOUS PROCESSING OF CO

This application claims priority to Chinese Patent Application No.: 201611238530.5, filed on Dec. 28, 2016, which is incorporated by reference for all purposes as if fully set forth herein.

TECHNICAL FIELD

The present invention relates to the field of nanocomposite materials, in particular to a hollow mesoporous carbon nanosphere composite material loaded with gold nanoparticles, and its preparation method and its application in continuous processing of CO.

BACKGROUND ART

In recent years, with the rapid development of technology and rapid industrialization, the emission of toxic gases such as CO, $SO_2$ and $NO_2$ is seriously exceeded, which has damaged the ecological environment and harmed human health. CO is one of the most common and most harmful toxic gases, the emissions of CO gas is mainly from the car exhaust and the inadequate combustion of coal. It is colorless and tasteless, and can quickly combine with the human hemoglobin, exclusion of oxygen, resulting in human hypoxia, it is seriously harm to human body health. Therefore, the treatment of CO gas pollution is imminent. It is a promising and widely used method for the treatment of CO to use the metal nanoparticles.

Gold nanoparticles have high stability and catalytic activity, however, in practical applications, gold nanoparticles as a catalyst require a good carrier. In previous reports, the commonly carrier is mainly $TiO_2$, $CeO_2$, etc., but the size of the gold nanoparticles loaded on the oxide is not controllable, and the distribution is not too uniform, so it is necessary to find a better carrier to load gold nanoparticles.

At present, mesoporous carbon materials as a carrier material is widely studied and applied; however, the preparation methods of mesoporous carbon material or immobilized gold nanoparticles on the surface of mesoporous carbon materials are relatively complex, the problem is one of the challenges facing. Therefore, in view of this problem, it is necessary to develop a simple and effective preparation method to prepare hollow mesoporous carbon nanospheres and supported catalyst.

SUMMARY OF THE INVENTION

The purpose of this invention is to provide a preparation method of hollow mesoporous carbon nanosphere composite material loaded with gold nanoparticles. The gold nanoparticles are loaded into the pores of the hollow mesoporous carbon sphere by the in situ reduction method, to achieve the purpose of continuously treating the CO gas in the air and discharged from engines.

In order to achieve the above purpose, the present invention adopts the following specific technical scheme:

A preparation method of hollow mesoporous carbon nanosphere composite material loaded with gold nanoparticles, which comprises the following steps:

(1) in the presence of initiator, aniline and pyrrole are polymerized in deionized water containing surfactant to form hollow carbon precursors, and then calcined to obtain hollow mesoporous carbon nanospheres, (2) said hollow mesoporous carbon nanospheres are immersed in the chloroauric acid solution, stirred and then centrifuged to remove the liquid, finally, hollow mesoporous carbon nanosphere composite material loaded with gold nanoparticles are obtained by reduction treatment.

In the above technical scheme, in step (1), the mass ratio of aniline, pyrrole, surfactant, initiator and deionized water is 13:9:3:63.5:2000; polymerization temperature is 0° C., polymerization time is 24 hours; the calcination is carried out in argon, the heating rate of calcination is 5° C./min, calcining time is 20 h and the temperature is 800~900° C., preferably 900° C. First, said aniline, pyrrole, surfactant and deionized water are mixed, and then the precooled initiator is added to polymerize, preferably, the initiator is pre-cooled at 0° C.; the initiator is preferably ammonium persulfate.

In the present invention, the hollow mesoporous carbon nanospheres are prepared by simple template-free method, it has a large specific surface area, uniform pore size, good conductivity, controllable structure, and good reproducibility, and it can be used as a good container for loading gold nanoparticles while the larger specific surface area can promote catalytic performance, it is also a good carrier material.

In the above technical scheme, in the step (2), the amount of the chlorinated acid solution and the hollow mesoporous carbon nanospheres is 1 L: 10 g; the concentration of the chloroauric acid solution is 18 to 25 mmol/L, preferably 20 mmol/L. And the stirring treatment is carried out under vacuum for 6 hours. The present invention adopts the simple in situ reduction method to directly load the Au nanoparticles into the hollow mesoporous carbon sphere, and the formed Au nanoparticles are extremely small and uniformly loaded into the channels of support to facilitate the continuous catalysis of CO oxidation.

In the present invention, after the centrifugal separation, the hollow mesoporous carbon nanospheres composites containing wet precursors were placed in a 1% CO atmosphere, to reduce the trivalent gold ions into gold nanoparticles by the weak reducibility of CO, so as to achieve the effect of continuously catalyzing CO during and after the preparation of the catalyst.

The present invention further indicated the application in continuous processing of CO of the hollow mesoporous carbon nanosphere composite material loaded with gold nanoparticles.

The present invention provide a method for continuous processing of CO, placing hollow mesoporous carbon nanosphere composite material loaded with gold nanoparticles according to claim 8 in an environment containing CO, to complete the treatment of CO.

The advantages of the present invention:

1. In the present invention, the hollow mesoporous carbon nanospheres has a large specific surface area, uniform pore size, good conductivity, controllable structure, and good reproducibility, and it can be used as a good container for loading gold nanoparticles while the larger specific surface area can promote catalytic performance, it is a good carrier material for catalyst.

2. In the present invention, hollow mesoporous carbon spheres are prepared by a simple method, and it has uniform pore size, large surface area and good repeatability; The formed Au nanoparticles were minimally and uniformly loaded into the channel of carrier; The CO oxidation can be continuously catalyzed during and after the formation of the catalyst.

3. In the present invention, the preparation method of the composite which was immobilized gold nanoparticles on hollow porous carbon nanospheres are simple. To overcome the shortcomings of the existing preparation methods. In particular, the preparation of such a simple preparation method has excellent performance in the treatment of CO, which is very advantageous for industrial applications.

DETAILED DESCRIPTIONS

Embodiment 1. Preparation of Hollow Mesoporous Carbon Nanospheres (HCNs)

1.9 ml of aniline, 1.45 ml of pyrrole, 0.3 g of the surfactant (TX-100) and 300 ml of deionized water was thoroughly mixed and then the prepared precooled (0° C.) ammonium persulfate was rapidly added, and reacted at 0° C. for 24 h, then the reaction product polymer carbon precursor was obtained by suction filtration and washed with deionized water. The polymer carbon precursor was dried in a vacuum.

the calcination is carried out at 900° C. for 20 h with a heating rate of 5° C./min in argon. In the present invention, the HCNs having a large specific surface area are obtained by calcination.

Figure 1:
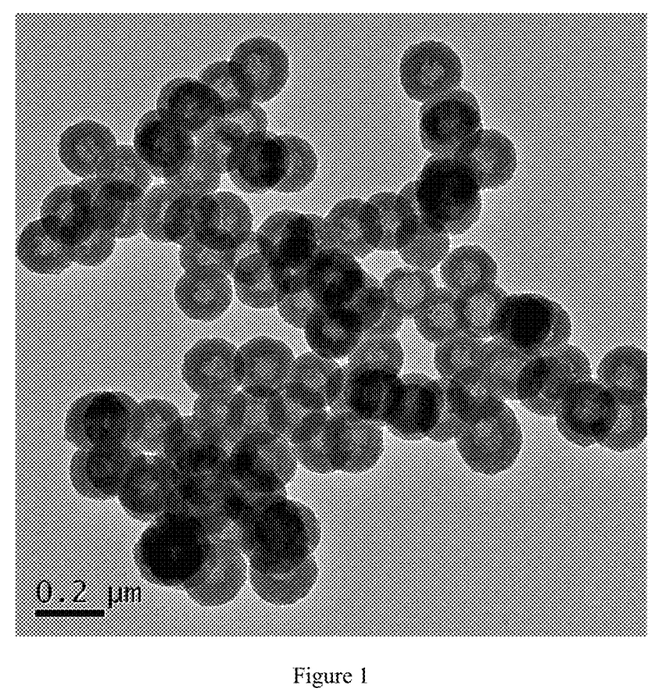
FIG. 1. TEM images of the precursor before calcination.
Figure 2:
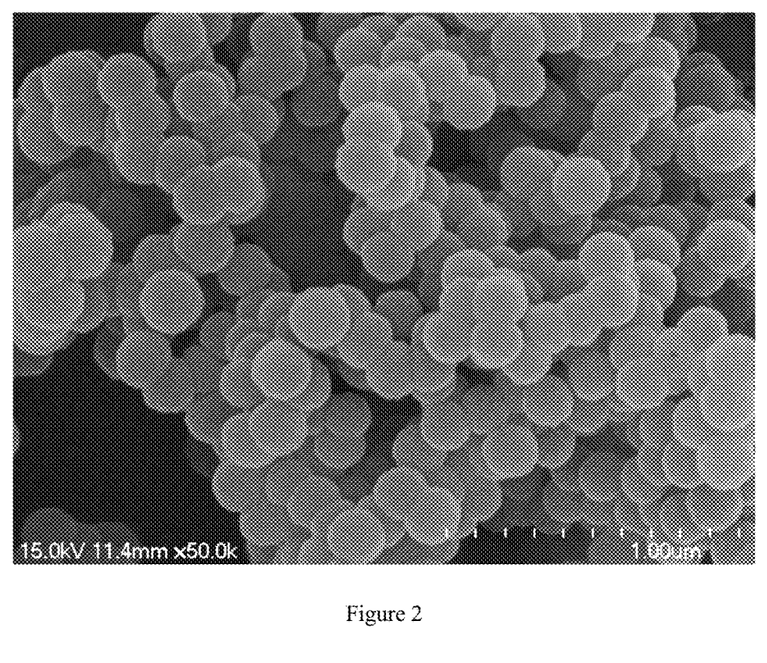
FIG. 2. SEM images of the precursor before calcination.
Figure 3:
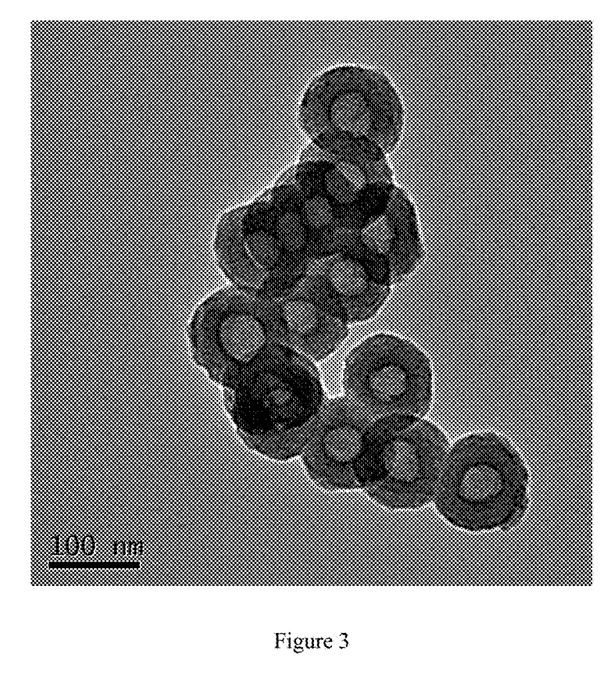
FIG. 3. TEM images of the hollow porous carbon nanospheres after calcination at 900° C.
Figure 4:
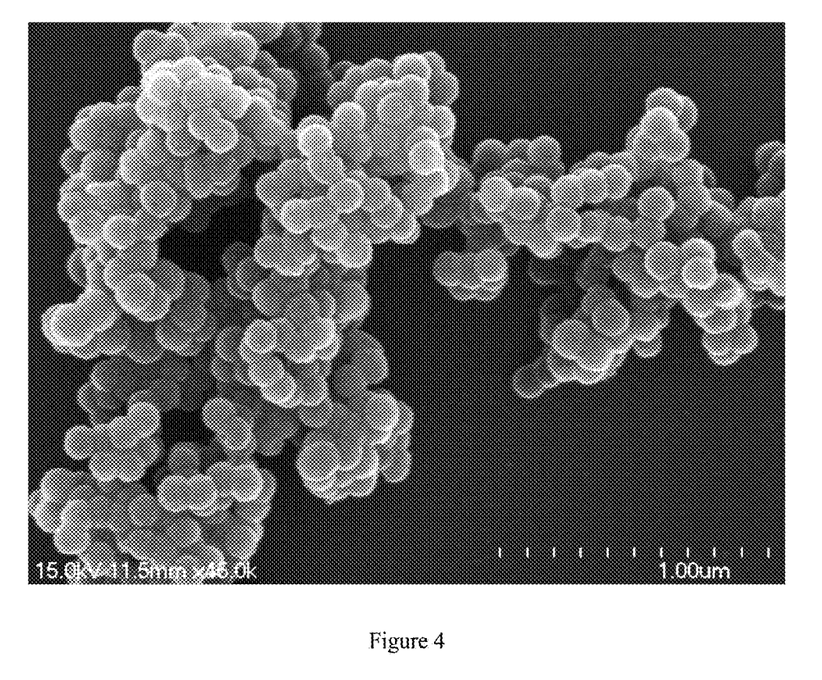
FIG. 4. SEM images of the hollow porous carbon nanospheres after calcination at 900° C.

FIG. 1 showed the TEM images of the polymer carbon precursor. FIG. 2 showed the SEM images of the polymer carbon precursor. FIG. 3 showed the TEM images of HCNs. FIG. 4 showed the SEM images of HCNs. From the figure we can see the hollow structure, and the distribution is more uniform, the diameter of nanospheres is smaller than before calcination.

Embodiment 2. Preparation of Hollow Mesoporous Carbon Nanospheres (HCNs)

1.9 ml of aniline, 1.45 ml of pyrrole, 0.3 g of the surfactant (TX-100) and 300 ml of deionized water was thoroughly mixed and then the prepared precooled (0° C.) ammonium persulfate was rapidly added, and reacted at 0° C. for 24 h, then the reaction product polymer carbon precursor was obtained by suction filtration and washed with deionized water. The polymer carbon precursor was dried in a vacuum. The calcination is carried out at 800° C. for 20 h with a heating rate of 5° C./min in argon. In the present invention, the HCNs having a large specific surface area are obtained by calcination.

Figure 5:
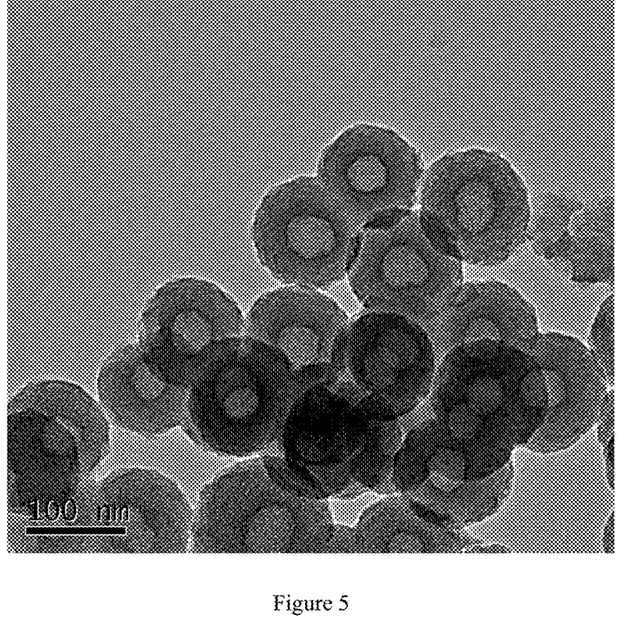
FIG. 5. TEM images of the hollow porous carbon nanospheres after calcination at 800° C.
Figure 6:
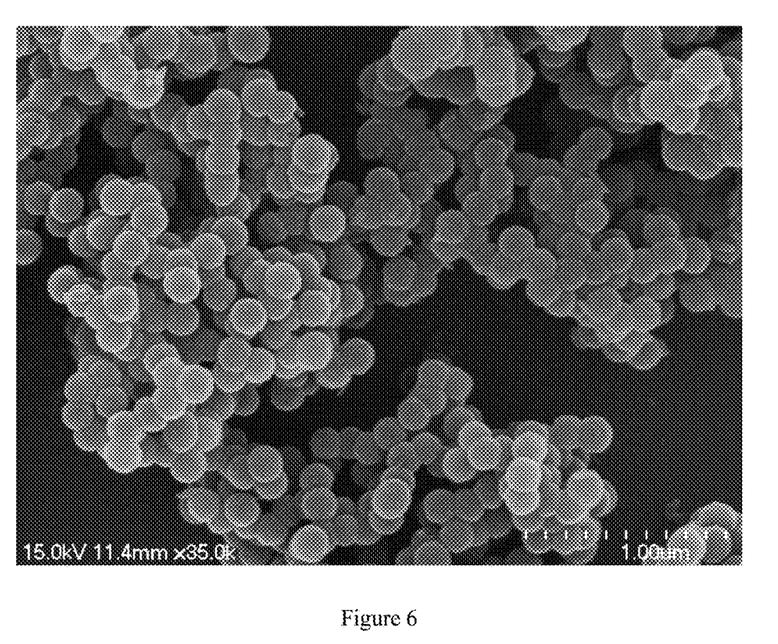
FIG. 6. SEM images of the hollow porous carbon nanospheres after calcination at 800° C.

FIG. 5 showed the TEM images of HCNs. FIG. 6 showed the SEM images of HCNs. From the figure we can see the hollow structure, and the distribution is more uniform, the diameter of nanospheres is smaller than before calcination. The surface area of HCNs is calcined at 800° C. less than 900° C.

Embodiment 3. Au Nanoparticles are Loaded into the Pores of the Hollow Mesoporous Carbon Spheres and Continuously Catalyze CO Oxidation The prepared 200 mg of HCNs (implementation 1) was dispersed in a chloroauric acid solution. To obtain a relatively homogeneous Au nanoparticle, the concentration of chloroauric acid solution was 20 mmol/L, the solution of 20 ml was added and stirred 6 h under vacuum, and then separated by centrifugation (11000 rpm, 10 min).

The HCNs containing chloroauric acid were dispersed in 200 ml of deionized water, adjusted to pH 11, and then centrifuged to obtain wet HCNs, and it was directly put into a 1% CO atmosphere for reduction and catalysis of CO oxidation.

Figure 7:
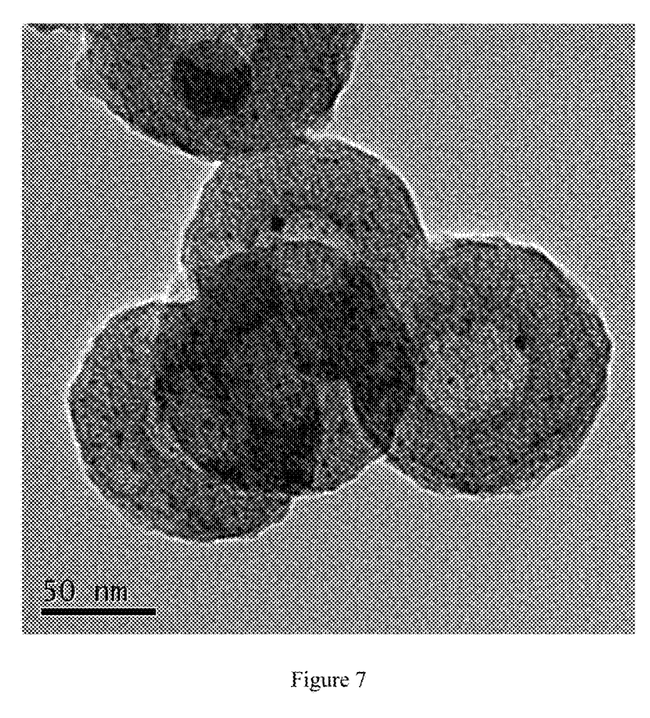
FIG. 7. TEM images of the Au/HCNs catalysts prepared with 20 mmol/L chloroauric acid solution.

FIG. 7 showed the TEM images of Au/HCNs. It can be seen that gold nanoparticles are successfully loaded into the pores of HCNs, and the distribution is relatively uniform.

The CO conversion is analyzed by gas chromatography. That is, through the standard gas to develop a standard curve, and the concentration of CO recorded as 1, and then with the catalytic progress, the concentration gradually decreased, resulting in a specific CO conversion results.

Figure 8:
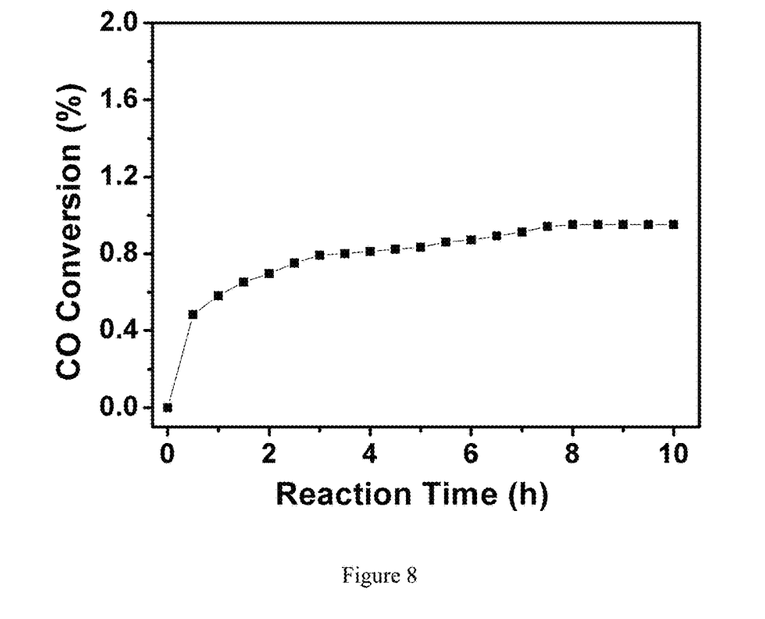
FIG. 8. The conversion of CO during the formation of the catalyst.
Figure 9:
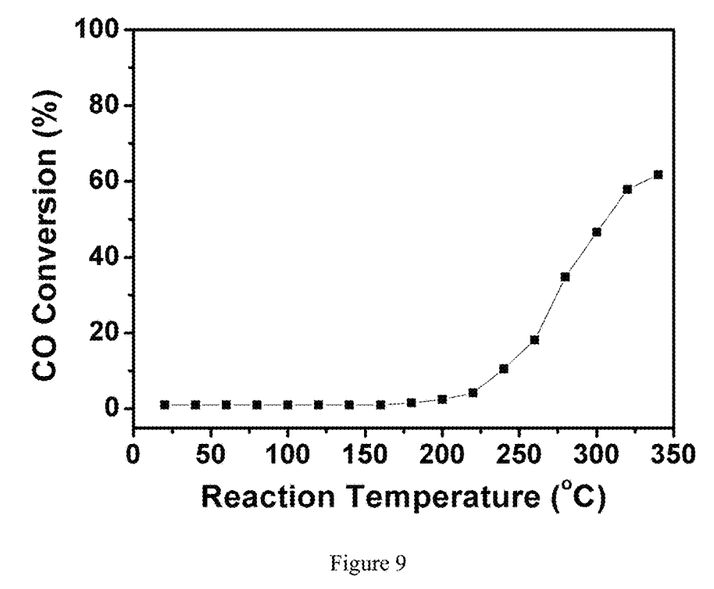
FIG. 9. The conversion of CO of the Au/HCNs catalysts prepared with 20 mmol/L chloroauric acid solution.

FIG. 8 showed the conversion of CO during the formation of the catalyst. FIG. 9 showed the conversion of CO of the Au/HCNs catalysts. FIG. 8 indicated that the CO conversion was about 1% during the formation of the catalyst, which proves that the weak reducibility of CO can reduce the trivalent gold ions, so that the purpose of continuous catalytic oxidation of CO can be realized. While the beginning of the CO conversion rate rose sharply to about 0.5% due to the adsorption performance of hollow porous carbon nanospheres. In FIG. 9, it can be seen that the CO conversion is kept at about 1% before the temperature is 150° C., After 150° C., with the increase of temperature, CO conversion rate increased to about 65%. As can be seen from FIG. 9, the invention can be applied to the conversion of CO at room temperature. CO pollution in the atmosphere mainly from the exhaust emissions of vehicles, the calculation method of CO conversion rate as shown in equation (1):

$$\eta = \frac{C_0 - C}{C_0} \times 100\%.$$

$C_0$ and $C$ were the initial and measured concentration (every 30 minutes) of CO, respectively. Embodiment 4.

Figure 10:
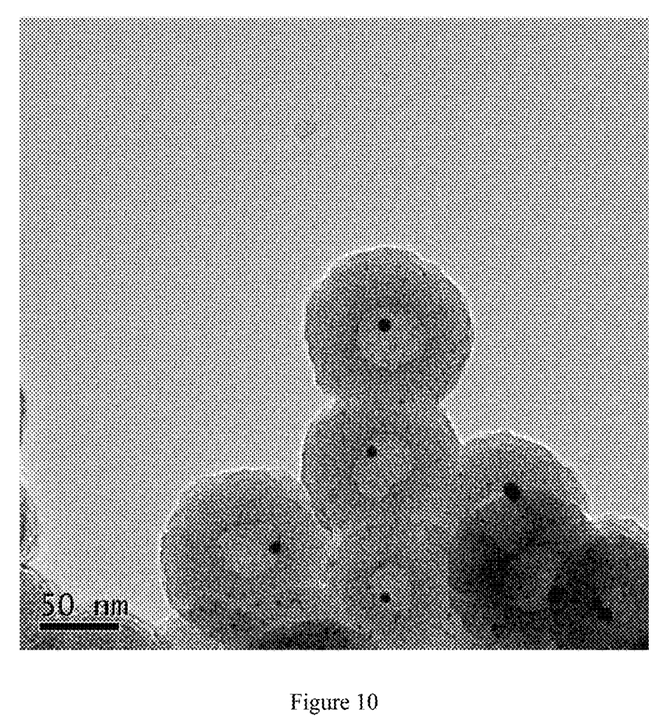
FIG. 10. TEM images of the Au/HCNs catalysts prepared with 25 mmol/L chloroauric acid solution.
Figure 11:
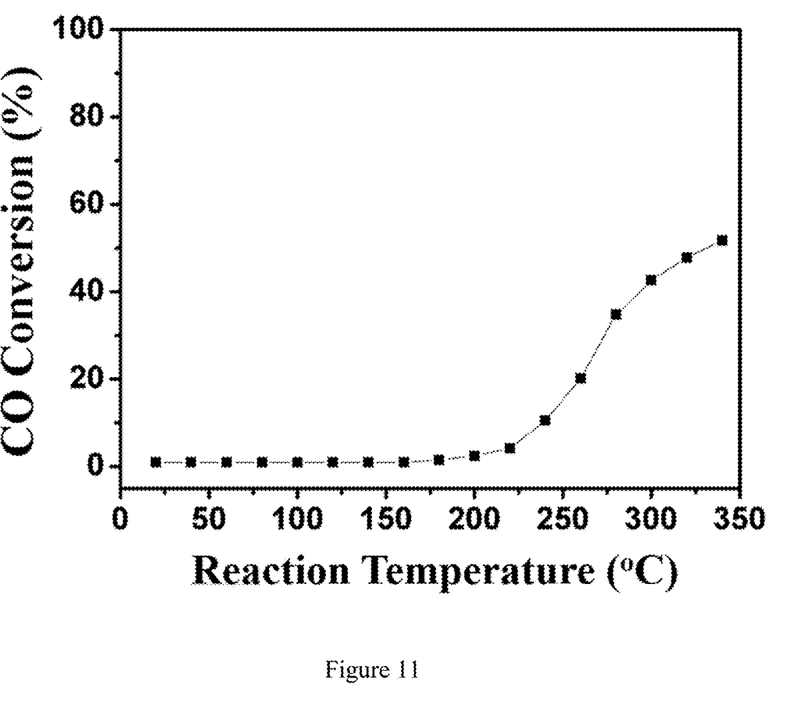
FIG. 11. The conversion of CO of the Au/HCNs catalysts prepared with 25 mmol/L chloroauric acid solution.

The hollow porous carbon nanospheres loaded with Au nanoparticles were prepared according to implementation 3, the hollow porous carbon nanospheres composites with gold nanoparticles were prepared by using 25 mmol/L chloroauric acid solution. FIG. 10 showed the TEM images. It can be seen that the distribution of gold nanoparticles is relatively inhomogeneous. FIG. 11 showed the conversion of CO, the final conversion rate is roughly 50%.

The above analysis shows that the Au nanoparticles can be successfully loaded into the pores of the hollow porous carbon nanospheres. The distribution of Au nanoparticles are relatively uniform and the catalysts have relatively good catalytic activity for CO. The hollow mesoporous carbon nanospheres can be used as a carrier to facilitate the recovery of the catalyst and the adsorption performance of the hollow mesoporous carbon ball. The invention can be used for the catalytic oxidation of CO in the process of synthesizing the catalyst and after the synthesis. Hollow porous carbon nanospheres as a carrier can facilitate the recovery of the catalyst. And because of the adsorption performance of the hollow porous carbon nanospheres, the invention showed the conversion of CO during and after the formation of the catalyst.

The invention claimed is:

1. A preparation method of hollow mesoporous carbon nanosphere composite material loaded with gold nanoparticles, which comprises the following steps:
   (1) in the presence of an initiator, aniline and pyrrole are polymerized in deionized water containing a surfactant to form hollow carbon precursors, and then calcined to obtain hollow mesoporous carbon nanospheres,
   (2) said hollow mesoporous carbon nanospheres are immersed in a chloroauric acid solution, stirred and then centrifuged, finally obtaining the hollow mesoporous carbon nanosphere composite material loaded with gold nanoparticles by reduction treatment.

2. The preparation method of hollow mesoporous carbon nanosphere composite material loaded with gold nanoparticles according to claim 1, wherein in step (1), the mass ratio of aniline, pyrrole, surfactant, initiator and deionized water is 13:9:3:63.5:2000.

3. The preparation method of hollow mesoporous carbon nanosphere composite material loaded with gold nanoparticles according to claim 1, wherein in step (1), polymerization temperature is 0° C., polymerization time is 24 hours; said initiator is ammonium persulfate.

4. The preparation method of hollow mesoporous carbon nanosphere composite material loaded with gold nanoparticles according to claim 1, wherein in step (1), calcination is carried out in argon, the heating rate of calcination is 5° C./min, calcining time is 20 h and the temperature is 800~900° C.

5. The preparation method of hollow mesoporous carbon nanosphere composite material loaded with gold nanoparticles according to claim 1, wherein in step (1), first, said aniline, pyrrole, surfactant and deionized water are mixed, and then the precooled initiator is added to polymerize.

6. The preparation method of hollow mesoporous carbon nanosphere composite material loaded with gold nanoparticles according to claim 1, wherein in step (2), the amount of said chloroauric acid solution and said hollow mesoporous carbon nanospheres is 1 L:10 g; the concentration of said chloroauric acid solution is 18-25 mmol/L.

7. The preparation method of hollow mesoporous carbon nanosphere composite material loaded with gold nanoparticles according to claim 1, wherein in step (2), the stirring treatment is stirring for 6 hours under vacuum, and the reduction treatment is carried out in CO.

8. A method of continuously processing of CO comprising:
   preparing a hollow mesoporous carbon nanosphere composite material loaded with gold nanoparticles according to the method of claim 1; and
   continuously treating CO with the hollow mesoporous carbon nanosphere composite material loaded with gold nanoparticles.

9. A method of continuously processing of CO comprising:
   preparing a hollow mesoporous carbon nanosphere composite material loaded with gold nanoparticles according to the method of claim 1; and
   placing the hollow mesoporous carbon nanosphere composite material loaded with gold nanoparticles in an environment containing CO, to complete the treatment of CO.

* * * * *